Patented Aug. 3, 1954

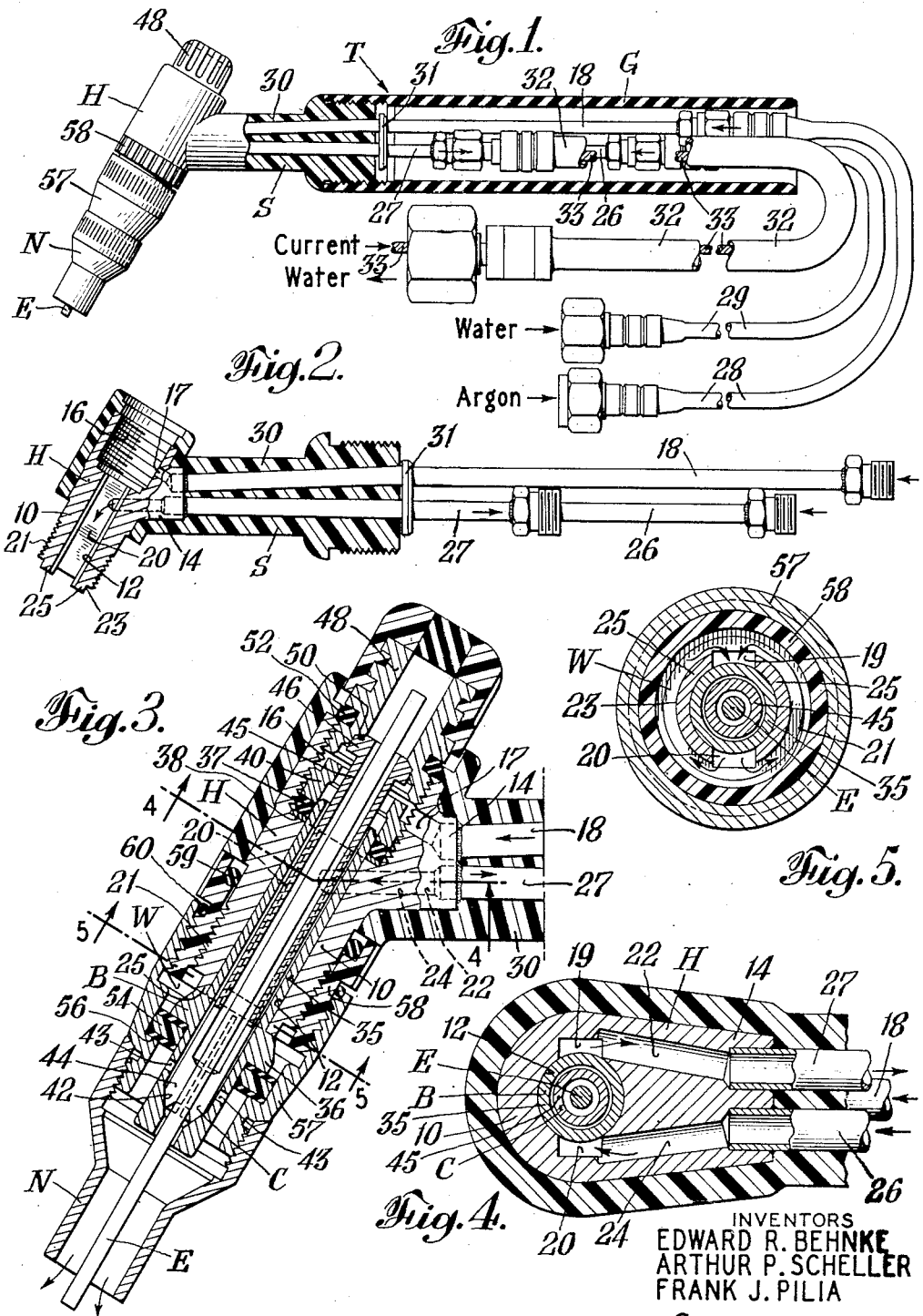

2,685,632

UNITED STATES PATENT OFFICE 2,685,632

GAS BLANKETED ARC WELDING TORCH

Edward R. Behnke, Parsippany, Arthur P. Scheller, Chatham, and Frank J. Pilia, West Orange, N. J., assignors to Union Carbide and Carbon Corporation, a corporation of New York Application July 17, 1951, Serial No. 237,188

6 Claims. (Cl. 219—15)

This invention relates to gas shielded arc welding torches, and more particularly to relatively heavy duty torches of this character provided with cooling means for conducting away from the torch excess heat from the arc and welding operation which would otherwise cause rapid deterioration of the torch structure.

Water cooled torches of this character have heretofore been provided with built-in water jackets and cooling passages which functioned satisfactorily for cooling purposes, but which were inaccessible for cleaning out accumulated scale, sediment or other foreign material, and unless this could be removed by an expensive flushing operation, the entire torch had to be discarded.

It is therefore the main object of the invention to provide a fluid cooled torch which is readily taken apart for cleaning, inspection, overhaul, repair or replacement of damaged parts.

Some of the prior water cooled torches have been provided with external tubing for circulating cooling water through a water jacket in the gas directing nozzle, which external tubing was a source of difficulty and annoyance. Further objects of this invention are to eliminate external cooling water leads in the nozzle and handle areas, to improve joint visibility and joint access, to remove the possibility of damage to flow lines causing torch breakdown, and to render the torch less awkward and less cumbersome to use.

Other objects are to improve the manufacture of the torch, to reduce the number of parts, to simplify the parts and economize the cost of construction thereof, to facilitate the assembly of the parts, to reduce the cost of securing them together, and minimize the number of soldered joints.

According to the present invention the gas shielded arc welding torch comprises a hollow current and gas supplying head, an electrode holder inserted in the hollow of said head, means for detachably sealing said holder in said head to form a cooling chamber therebetween, means for supporting a gas directing nozzle adjacent the lower end of said holder, said holder having a continuous gas passage from the hollow of said head to the interior of said nozzle. Preferably the inner wall of the head and the outer wall of the holder have a space therebetween, and the top and bottom of coextensive portions of these walls are sealed to form the cooling chamber. The head has cooling fluid inlet and outlet passages opening into the hollow thereof to facilitate cleaning when the holder is removed. A cooling jacket may be detachably connected to the head and holder in fluid tight relation, and clamp the holder in position in the head, and the gas directing nozzle is preferably threaded onto the cooling jacket. The holder is desirably provided with an internal conical seat below the cooling chamber, and an electrode cap preferably threaded in the outer end of the hollow of the head to clamp an electrode gripping collet against the seat.

In the drawings:

Fig. 1 is an elevation, partly in section, of a fluid cooled gas shielded arc welding torch according to the preferred embodiment of the present invention;

Fig. 2 is a section through the torch head showing its supply tubes;

Fig. 3 is a larger section through the torch head assembly;

Fig. 4 is a section taken along the line 4—4 of Fig. 3; and

Fig. 5 is a section taken along the line 5—5 of Fig. 3.

The torch indicated generally at T comprises a hollow current and gas supplying head H rigidly connected intermediate its ends at an oblique angle to a shank S, which may have a handle or hand grip G. Detachably connected to one end of the head H is an electrode holder barrel B, containing a collet C coacting therewith to grip an electrode E. The head and holder are detachably sealed to form a cooling chamber W. A gas directing nozzle N is mounted adjacent the lower end of the electrode holder barrel B, which has a continuous gas passage from the interior of the head H to the interior of the nozzle N.

As shown in Fig. 2, the head H comprises a hollow metal insert 10 having an axial bore 12 and an integral lateral boss 14. The upper end of the bore 12 is enlarged and threaded as at 16, and the boss 14 is drilled to form a gas inlet passage 17 opening into the threaded bore 16. A gas inlet tube 18 is permanently secured in the outer end of the passage 17.

The inside of the head insert 10 is broached on each side of the bore 12 to form longitudinal grooves 19 and 20 below the threaded bore 16. The lower portion of the outside of the head insert 10 is externally threaded as at 21, below which is cut an annular groove 23 connecting the lower ends of the grooves 19 and 20 but leaving depending abutments 25 therebetween.

As shown in Fig. 4, the head insert 10 is drilled through the boss 14 below the gas inlet passage 17, forming straight passages 22 and 24 respectively opening into the grooves 19 and 20. A fluid inlet tube 26 is permanently secured in the outer end of passage 24, and a fluid outlet tube 27 is permanently secured in the outer end of passage 22. The tubes 18, 26 and 27 are preferably of copper, and preferably secured in the boss 14 by silver solder.

The insert 10 and the tubes secured in its boss have a plastic cast therearound to form an insulating cover 30 for the head H and shank S, the tubes passing through a brass spacer 31 for convenience in the molding operation. The plastic is preferably nylon, and the head insert 10 is preferably of tobin bronze for strength to resist the high molding pressure, and still have high heat and electrical conductivity.

The hand grip G is a tube of plastic insulation threaded onto the shank S, and readily removable to facilitate detachable connection of the torch to sources of welding current, shielding gas and cooling medium. The tubes 18, 26 and 27 are of different lengths to stagger the couplings and facilitate such connection. The gas tube 18 is coupled to a flexible shielding gas supply hose 28. The water inlet tube 26 is coupled to a flexible water inlet hose 29. The water outlet tube 27 is coupled to a flexible water outlet hose 32, which contains a flexible electrical conductor 33. The conductor 33 is automatically electrically connected to the metal water outlet tube 27 when the coupling is made, to supply the electric welding current to the metal torch head insert 10. The hoses 28, 29 and 32 are threaded through the hand grip G before the couplings are connected, and thereafter slid along over the same and screwed onto the shank S thus covering all the completed couplings.

The electrode holder or barrel B is preferably of copper, and comprises a cylindrical sleeve portion 35, which slidably fits into the bore 12, and a collar 36 which abuts the lower end of the insert 10. The upper end of the sleeve 35 engages an O-ring 37 which rests on top of a metal washer or shim 38 on the bottom of the threaded bore 16 and closing the tops of the grooves 19 and 20. An internally polygonally broached brass cap nut 40 is threaded into the threaded bore 16, compresses the O-ring 37 and clamps the shim 38 in position, and squeezes the inner side of the O-ring 37 into detachable sealing engagement with the sleeve portion 35.

The lower portion of the barrel B below the collar 36 has an internal conical seat 42 which receives an external conical split end 44 of a collet 45 fitting in the bore of the sleeve 35. Above the seat 42 and below the collar 36 the holder B has radial gas apertures 43. The collet 45 is preferably of steel, and extends up beyond the top of the sleeve 35 and through the broaching of cap nut 40, terminating in an enlarged head 46.

Threaded in the top of the bore 16 above the cap nut 40 is an electrode cap 48 having an annular seat 50 engaging the collet head 46, and forcing it down to cause the split end 44 to engage the seat 42 and contract to grip the electrode E. The electrode cap 48 comprises a brass insert and a plastic covering, the metal insert having an external groove receiving an O-ring 52 sealing the joint between the cap 48 and the head H.

The lower side of the collar 36 on the electrode holder B abuts against a sealing gasket 54 preferably composed of layers of synthetic rubber cemented to thermosetting plastic. This gasket rests on an internal annular shoulder 56 in a bronze water jacket 57, which is threaded onto a plastic insulating sleeve 58, in turn threaded onto the threaded portion 21 of the torch head insert. The upper end of the insulating sleeve 58 abuts the torch head insulating cover 30, and has an internal annular groove receiving an O-ring 59 sealing against the torch head insert 10. The upper end of the jacket 57 has an internal annular groove receiving an O-ring 60 sealing against the insulating sleeve 58. The nozzle N is preferably of pure copper, threaded onto the lower end of the water jacket 57.

In assembling the torch, the electrode holder B is inserted in the head H, with the sleeve portion 35 fitting in the bore 12 and extending therabove into the threaded bore 16. The metal washer 38 is inserted in the threaded bore 16 and fitted down over the top of the sleeve portion 35 to rest on the bottom of the bore 16. The O-ring 37 is fitted over the sleeve portion 35 to rest on the washer 38. The cap nut 40 is screwed down into the bore 16, compressing the O-ring 37.

The O-ring 59 is passed over the threaded portion of the torch head insert, followed by the insulating sleeve 58, which is screwed onto the threaded portion 21. The electrode holder B may be removed by pulling the sleeve portion 35 out through the O-ring 37, but the other parts remain in relatively permanent position as parts of the torch head H.

With the electrode holder B inserted in the torch head H, the top of the sleeve 35 passes through the O-ring 37 and squeezes it into sealing relation. The O-ring 60 is passed over the threads on the insulating sleeve 58. The sealing gasket 54 is inserted in the water jacket 57, to rest on the shoulder 56, and the jacket 57 is screwed onto the sleeve 58, which causes the shoulder 56 to compress the gasket 54, and force the top of the collar 36 against the depending abutments 25 on the torch head insert 10.

The nozzle N is screwed onto the water jacket 57, and the collet 45 is inserted through the top of the torch head down through the broaching in the cap nut 40 into the bore of sleeve 35 with the conical bottom 44 engaging the internal seat 42. The electrode cap 48 is screwed into the head insert bore 16 until the cap seat 50 therein engages the collet head 46. The electrode E is inserted through the nozzle N, conical seat 42 of the electrode holder B, and the collet end 44 into adjusted position, after which the cap nut 48 is tightened to cause the collet to grip the electrode and hold it in position.

In operation, electric welding current passes from the cable 33 through the metal water outlet tube 27, to the metal torch head insert 10. The abutments 25 depending from the insert 10 make electrical contact with the holder collar 36, so that the welding current passes from the insert 10 through the holder B, seat 42, jaws 44 to the electrode E.

Shielding gas passes from the gas inlet hose 28 to the gas inlet tube 18, through the passage 17 to the threaded bore 16, the top of which is closed by the electrode cap 48. From the bore 16 the gas flows through the broaching in cap nut 40 down the annular space between the collet 45 and holder sleeve 35, and out through the radial apertures 43 to the interior of the water jacket 57 and the interior of the nozzle N. Cooling medium such as water passes from the water inlet hose 29 through water inlet tube 26 and passage 24 to the longitudinal channel 23 from which the water passes to the annular water chamber W, formed by the annular groove 23 in the head insert 10, the bottom of the insulating sleeve 56, the outside of the collar 36, the top of the gasket 54, and the inner wall of the jacket 57. From the chamber W the water passes up through the channel 19, out through passage 22 and water outlet tube 27 to the water discharge hose 32. The collar 36 forms the greatest mass of copper in the electrode holder, and directly contacts the cooling medium in chamber W, for greatest heat conductivity and consequent efficient cooling.

The electrode cap 48 provides a quick release for the collet 45. A slight turn of the cap 48 takes pressure off the collet jaws 44 against the seat 42 and permits adjustment of the electrode. Removal of the cap 48 permits removal and replacement of the collet 45.

The water jacket 57 provides a quick take apart of the water system. Removal of the jacket 57 permits removal of the holder B and opens the chamber W for cleaning. Also this opens the through bore 12 of the head insert 10 for ready cleaning of the channels 19 and 20. The passages 22 and 24 open into this bore and are substantially aligned with the tubes 26 and 27 so that wires can be passed therethrough for cleaning purposes.

We claim:

1. A quick take apart liquid cooled gas shielded arc welding torch comprising in combination, a hollow current and gas supplying head having an upper lateral gas passage with an inlet into the hollow of said head and lower lateral water passages with an inlet and an outlet connected to the hollow of said head, an electrode holder removably inserted in the hollow of said head and extending above said water passage inlet and outlet, axially coextensive portions of said head and holder being spaced apart radially to leave passages therebetween, means for detachably sealing said holder in said head to form a cooling chamber therebetween comprising an annular resilient member engaging the outside of the upper end portion of said holder and engaging the inside of said head between said gas inlet and said water inlet and outlet, and means cooperating with said head for supporting a lower annular resilient member engaging the outside of the lower end portion of said electrode holder to seal off the bottom of the water jacket formed therebetween, means for supporting a gas directing nozzle adjacent the lower end of said holder, said holder having a continuous gas passage from the hollow of said head to the interior of said nozzle, said removable electrode holder and said detachable sealing means permitting the holder to be removed from the head for cleaning the cooling chamber, and thereafter replaced in liquid tight relation.

2. A quick take-apart liquid cooled gas shielded arc welding torch, comprising in combination a hollow current and gas supplying head having an upper lateral gas passage with an inlet and lower lateral water passages with an inlet and an outlet connected to the hollow of said head, an electrode holder removably inserted in the hollow of said head and extending above said water inlet and outlet, longitudinally coextensive portions of said head and holder being spaced apart to leave passages therebetween, means for detachably sealing said holder in said head to form a cooling chamber therebetween comprising an upper annular resilient member engaging the outside of the upper portion of said holder and engaging the inside of said head between said gas inlet and said water inlet and outlet, and means cooperating with said head for supporting a lower annular resilient member engaging the outside of the lower end portion of said electrode holder to seal off the bottom of the water jacket formed therebetween, said holder having an internal conical seat below said water jacket, an electrode gripping collet in said holder having a lower split conical end engaging said seat and extending above said passage inlets and outlet, and an electrode cap threaded in the other end of the hollow of said head to engage the top of said collet and urge the lower end thereof against said seat.

3. In a gas shielded arc welding torch, a hollow current and gas supplying head, an electrode holder detachably and telescopically slidably inserted in the hollow of said head and having a downwardly facing annular shoulder on the lower portion thereof, the inner wall of said head and the outer wall of said holder having a space therebetween, said head having an upper lateral gas passage with an inlet into the hollow of said head and lower lateral water passages with an inlet and an outlet connected to the hollow of said head, means for detachably sealing the top of coextensive portions of said walls to form cooling passages comprising an O-ring engaging the outside of the upper end portion of said holder and engaging the inside of said head between said gas inlet and said water inlet and outlet, and means cooperating with said head for supporting an annular gasket engaging the underside of said electrode holder shoulder to seal off the bottom of the water jacket formed therebetween, said means including screw threads for compressing said gasket axially against said shoulder, said O-ring being compressed radially outwardly when the upper end of said holder is inserted axially therein, and means for supporting a gas directing nozzle adjacent the lower end of said holder, said holder having a continuous passage from the hollow of said head to the interior of said nozzle.

4. In a gas shielded arc welding torch, a hollow current and gas supplying head, an electrode holder detachably inserted in the hollow of said head and having a downwardly facing shoulder on the lower portion thereof, a cooling jacket comprising a sleeve of greater diameter than said holder fitted over the lower end thereof and having an upwardly facing internal annular shoulder, an annular gasket interposed between the lower surface of said holder shoulder and the upper surface of said jacket shoulder, screw thread and gasket means for securing the upper rim of said jacket sleeve to said head in fluidtight relation to form therebelow a cooling chamber within said jacket sleeve above said annular gasket, and means for supporting a gas directing nozzle on said jacket sleeve below said annular gasket and adjacent the lower end of said holder, said holder having a continuous gas passage from the hollow of said head to the interior of said nozzle.

5. In a gas shielded arc welding torch, a hollow current and gas supplying head, having gas inlet and water inlet and outlet passages opening into the hollow thereof, said hollow comprising a bore and coextensive longitudinal grooves broached into the wall of said bore on opposite sides thereof and communicating with said water passages, an electrode holder detachably inserted in the hollow of said head and having a cylindrical barrel longitudinally slidable into and snugly fitting said bore, means for sealing said head and holder above said water inlet and outlet and below said gas passage inlet, means secured to said head and surrounding said holder and sealed to the lower portion thereof to form a cooling chamber extending annularly around said holder in communication with the lower ends of said longitudinal grooves, means for supporting a gas directing nozzle adjacent the lower end of said holder, said holder having a continuous gas passage from the interior of said head to the interior of said nozzle.

6. In a gas shielded arc welding torch, a hollow current and gas supplying head, an electrode holder longitudinally slidably inserted in the hollow of said head, means for detachably sealing said holder in said head to form therebetween a gas chamber and a cooling chamber therebelow, comprising an annular sealing element in said head engaging the top portion of said holder below said gas chamber and above said cooling chamber, and an annular gasket engaging the lower portion of said holder below said cooling chamber, means for supporting a gas directing nozzle adjacent the lower end of said holder, said holder having a continuous gas passage from said gas chamber to the interior of said nozzle.

References Cited in the file of this patent

UNITED STATES PATENTS

| Number | Name | Date |
|---|---|---|
| 1,946,302 | Weller | Feb. 6, 1934 |
| 2,093,821 | Southgate | Sept. 21, 1937 |
| 2,468,807 | Herbst | May 3, 1949 |
| 2,512,706 | Anderson | June 27, 1950 |
| 2,512,707 | Anderson | June 27, 1950 |
| 2,527,235 | Tuthill | Oct. 24, 1950 |